(12) United States Patent
Manneschi

(10) Patent No.: US 11,768,310 B2
(45) Date of Patent: Sep. 26, 2023

(54) DOUBLE-FIELD SECURITY BODY SCANNER

(71) Applicant: Alessandro Manneschi, Arezzo (IT)

(72) Inventor: Alessandro Manneschi, Arezzo (IT)

(*) Notice: Subject to any disclaimer, the term of this patent is extended or adjusted under 35 U.S.C. 154(b) by 251 days.

(21) Appl. No.: 17/426,455

(22) PCT Filed: Jan. 29, 2020

(86) PCT No.: PCT/EP2020/052177
§ 371 (c)(1),
(2) Date: Jul. 28, 2021

(87) PCT Pub. No.: WO2020/157139
PCT Pub. Date: Aug. 6, 2020

(65) Prior Publication Data
US 2022/0107438 A1    Apr. 7, 2022

(30) Foreign Application Priority Data
Jan. 29, 2019  (FR) .................................. 1900765

(51) Int. Cl.
  *G01V 3/10*   (2006.01)
  *G01S 13/88*  (2006.01)
  *G01S 13/89*  (2006.01)
  *G01V 8/00*   (2006.01)

(52) U.S. Cl.
  CPC .............. *G01V 3/10* (2013.01); *G01S 13/887* (2013.01); *G01S 13/89* (2013.01); *G01V 8/005* (2013.01)

(58) Field of Classification Search
  CPC .......... G01V 3/10; G01V 8/005; G01V 11/00; G01S 13/887; G01S 13/89; G01S 13/86

USPC ......................................................... 324/329
See application file for complete search history.

(56) References Cited

U.S. PATENT DOCUMENTS

| 2006/0038563 A1* | 2/2006 | Chisholm ............ G01R 33/441 324/309 |
| 2007/0030141 A1 | 2/2007 | Manneschi et al. |
| 2009/0322873 A1 | 12/2009 | Reilly et al. |

(Continued)

FOREIGN PATENT DOCUMENTS

| EP | 1750147 A1 | 2/2007 |
| EP | 2854217 A1 | 4/2015 |

(Continued)

OTHER PUBLICATIONS

International Search Report including Written Opinion for Application No. PCT/EP2020/052177, dated Mar. 26, 2020, 14 pages.

(Continued)

*Primary Examiner* — Christopher P McAndrew
(74) *Attorney, Agent, or Firm* — Lerner David LLP

(57) ABSTRACT

The present invention relates to a detection system comprising detection means (140) of the inductive field type and detection means (10) using microwave field-based imaging, analysis means (50) which are suitable for analysing the signals from the inductive detection means (140) and for deducing therefrom the potential presence of the metal targets, and means which are suitable for correspondingly modifying, at least in a zone of interest, the sensitivity of the detection means (10) using microwave-based imaging.

18 Claims, 10 Drawing Sheets

(56) References Cited

U.S. PATENT DOCUMENTS

| | | | | |
|---|---|---|---|---|
| 2010/0161241 A1* | 6/2010 | Manneschi | ............. | G01T 1/163 |
| | | | | 702/22 |
| 2010/0220001 A1* | 9/2010 | Longstaff | ............... | H01Q 1/007 |
| | | | | 342/201 |
| 2011/0102597 A1* | 5/2011 | Daly | .................... | G01S 13/887 |
| | | | | 348/E5.085 |
| 2013/0169466 A1* | 7/2013 | Frederick | ............. | G01S 13/887 |
| | | | | 342/22 |
| 2016/0143558 A1* | 5/2016 | Chernokalov | ....... | A61B 5/0507 |
| | | | | 600/430 |
| 2017/0254750 A1* | 9/2017 | Xin | ........................ | H03M 7/30 |
| 2019/0113613 A1* | 4/2019 | Manneschi | ........... | G01S 13/887 |
| 2021/0103047 A1* | 4/2021 | Aflatouni | .................. | G01S 7/03 |

FOREIGN PATENT DOCUMENTS

| | | | | | |
|---|---|---|---|---|---|
| EP | | 2960685 A2 | 12/2015 | | |
| FR | | 3092176 A1 * | 7/2020 | ............. | G01S 13/86 |
| WO | | 2018225028 A2 | 12/2018 | | |

OTHER PUBLICATIONS

French Search Report including Written Opinion for Application No. FR 1900765, dated Nov. 20, 2019, 8 pages.

* cited by examiner

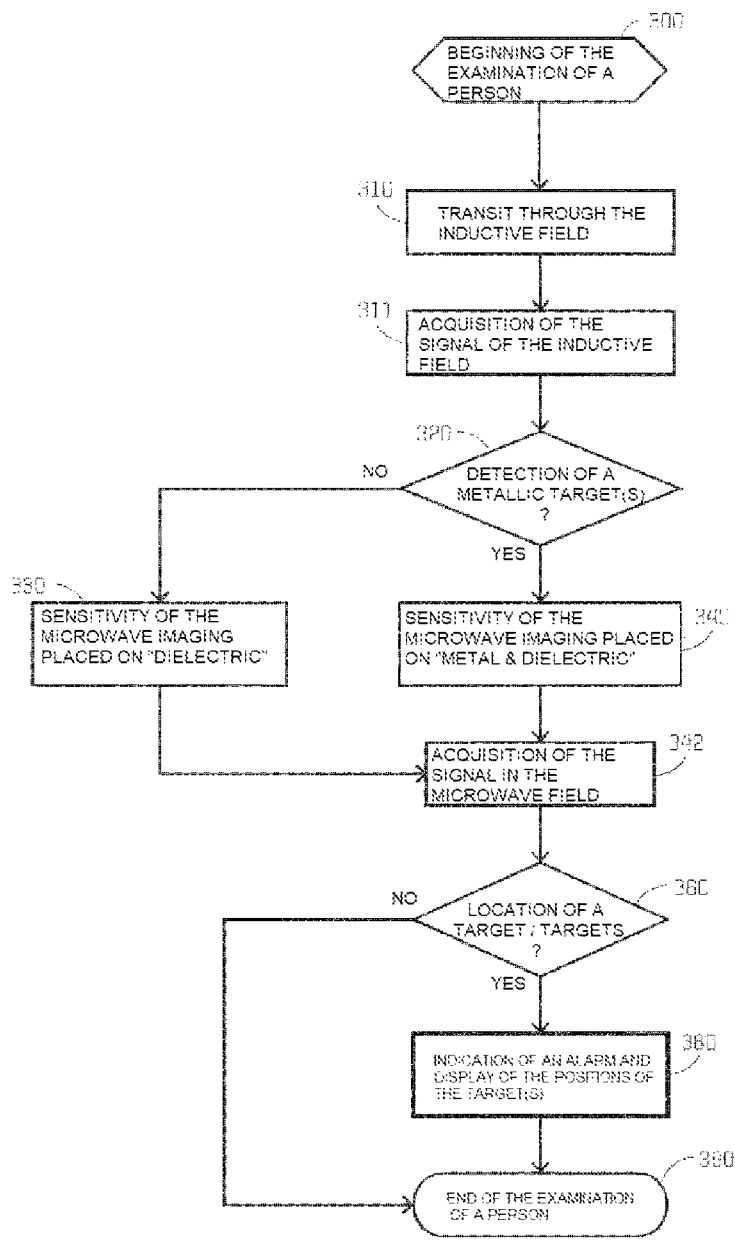

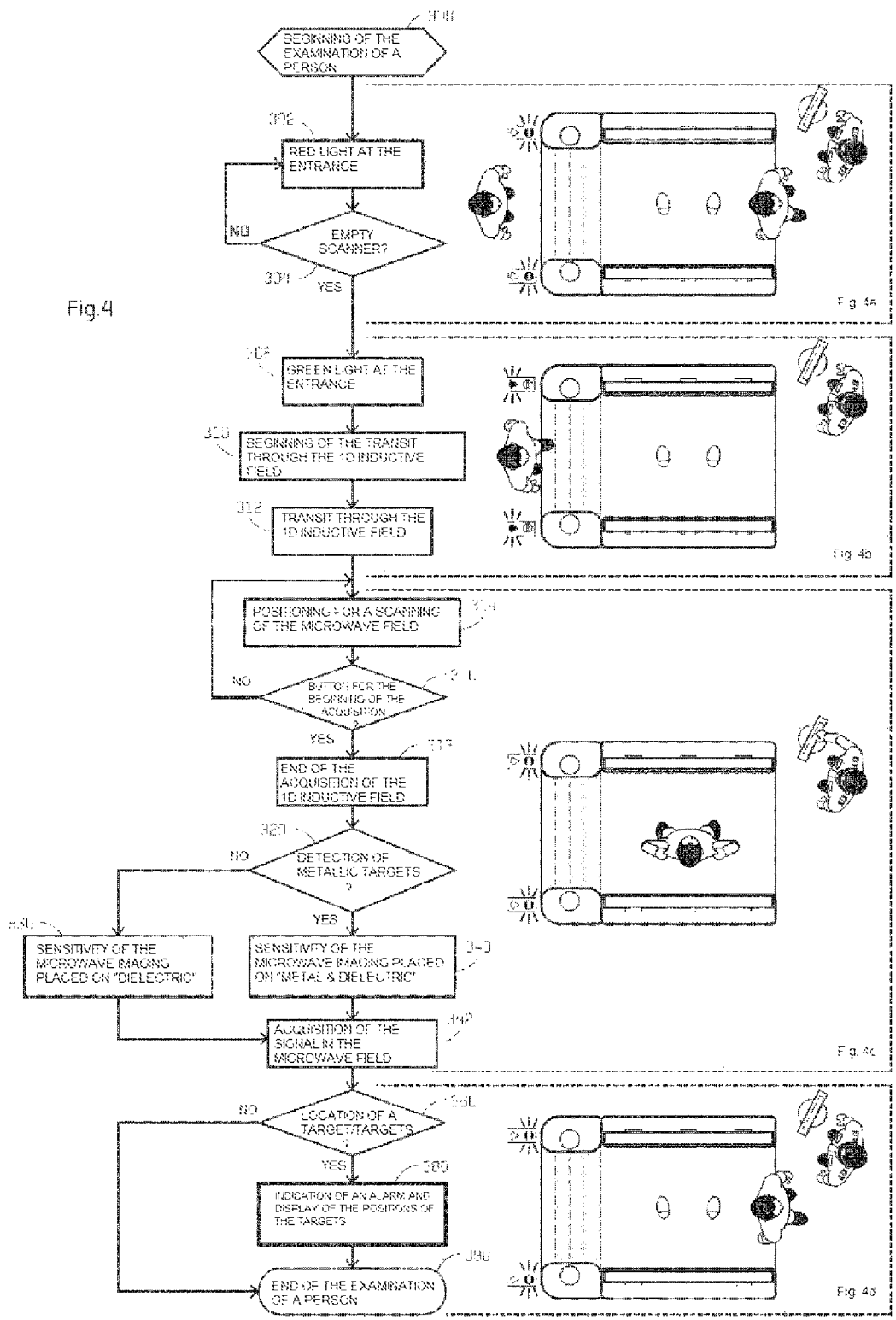

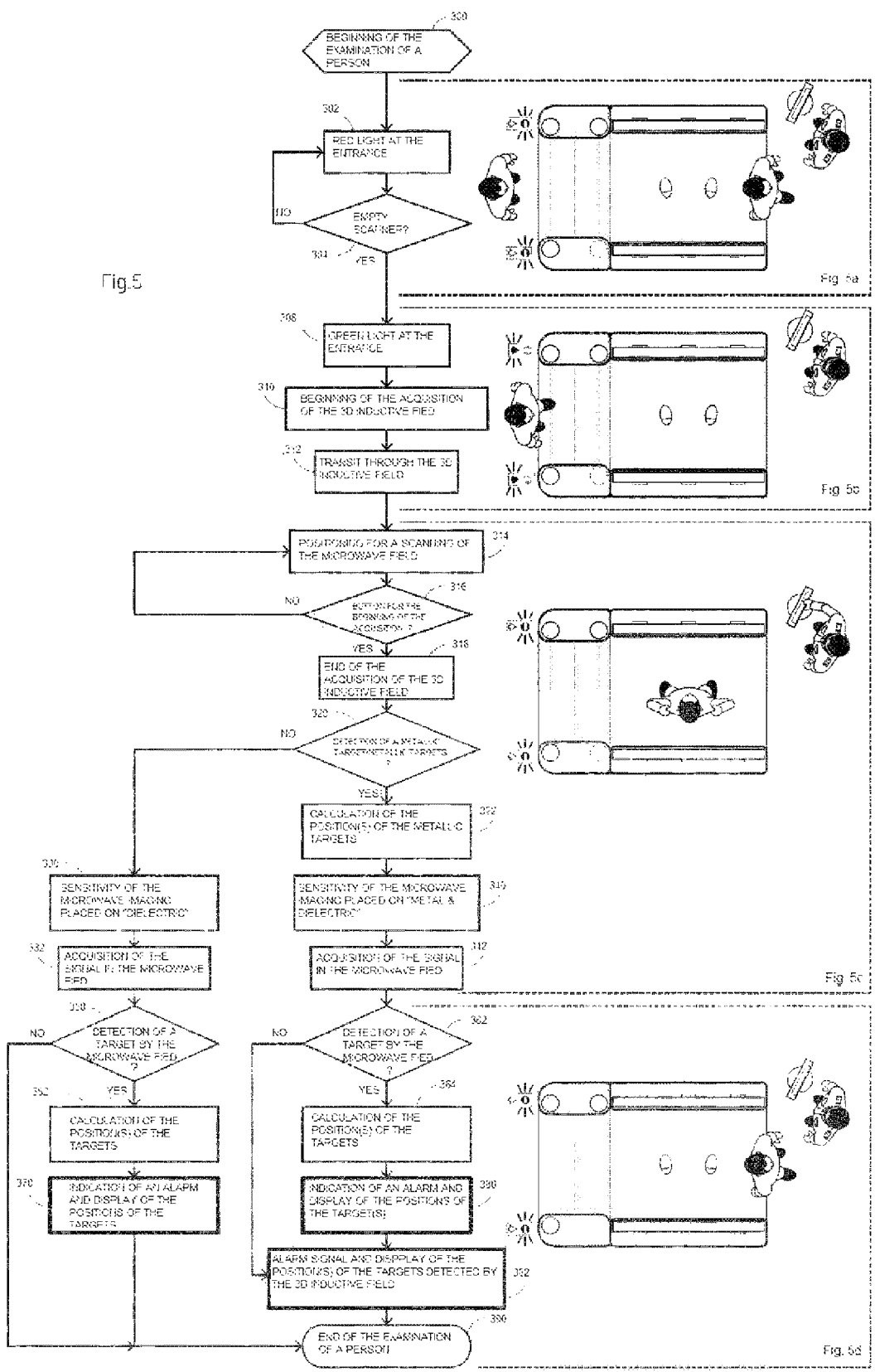

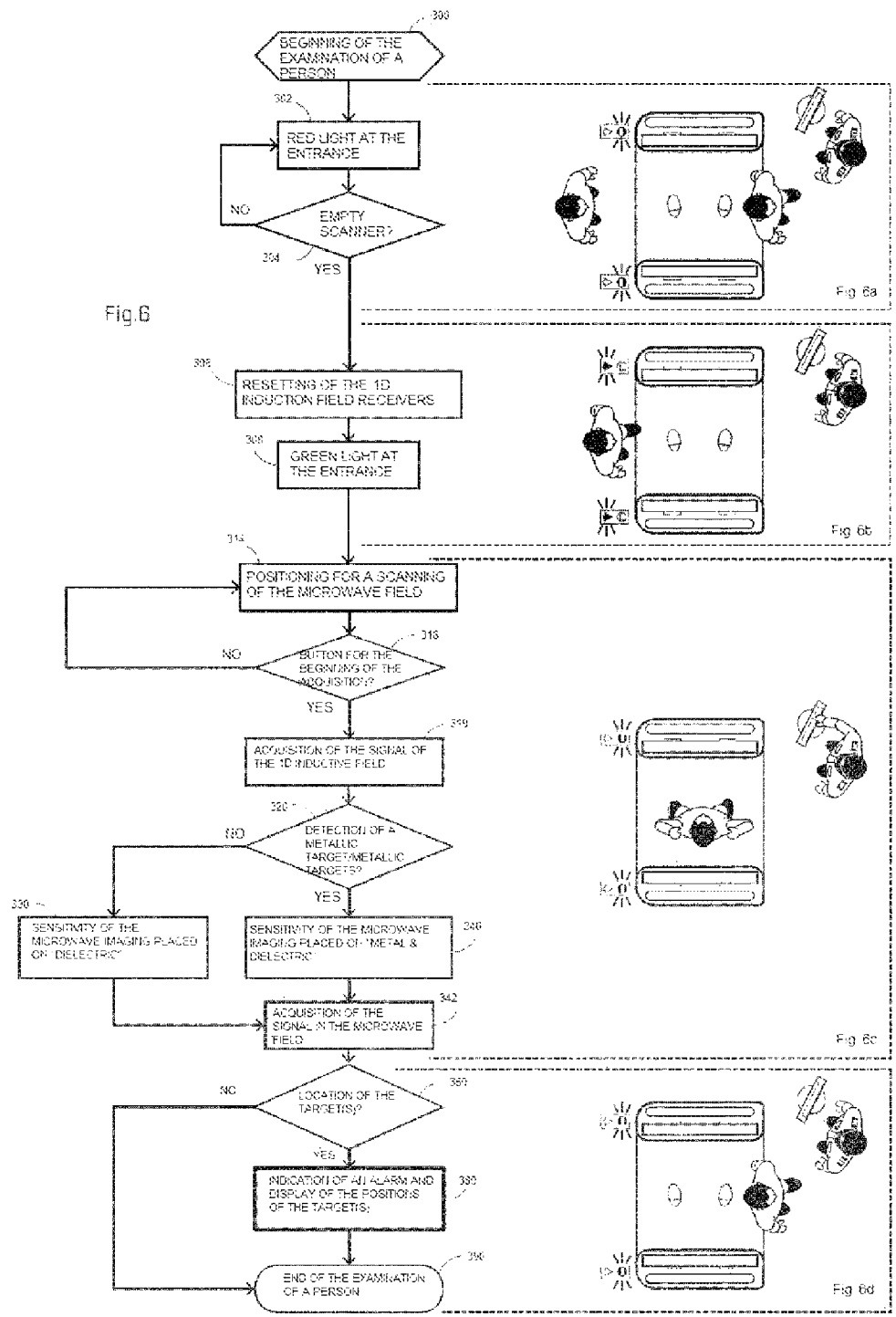

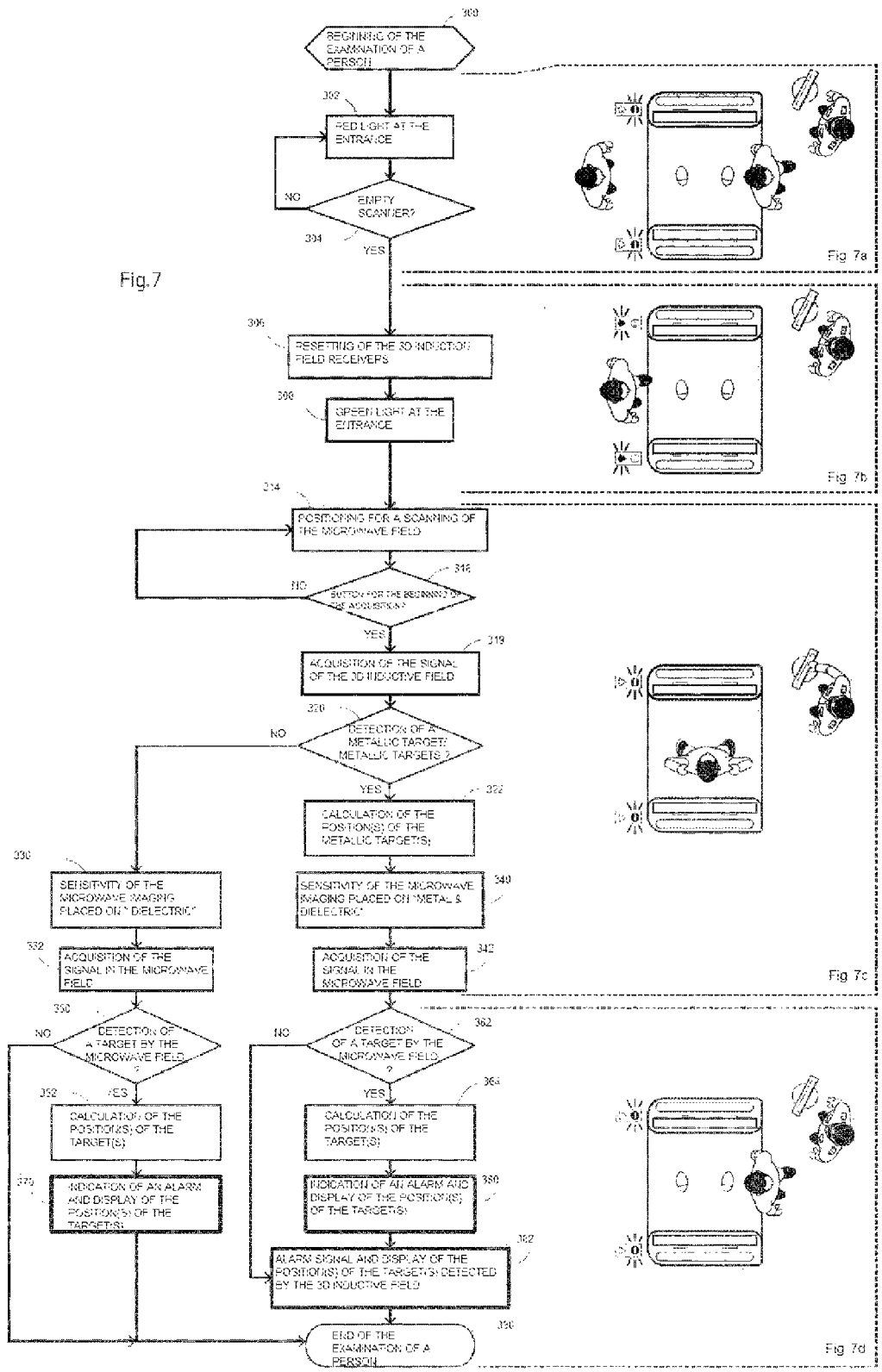

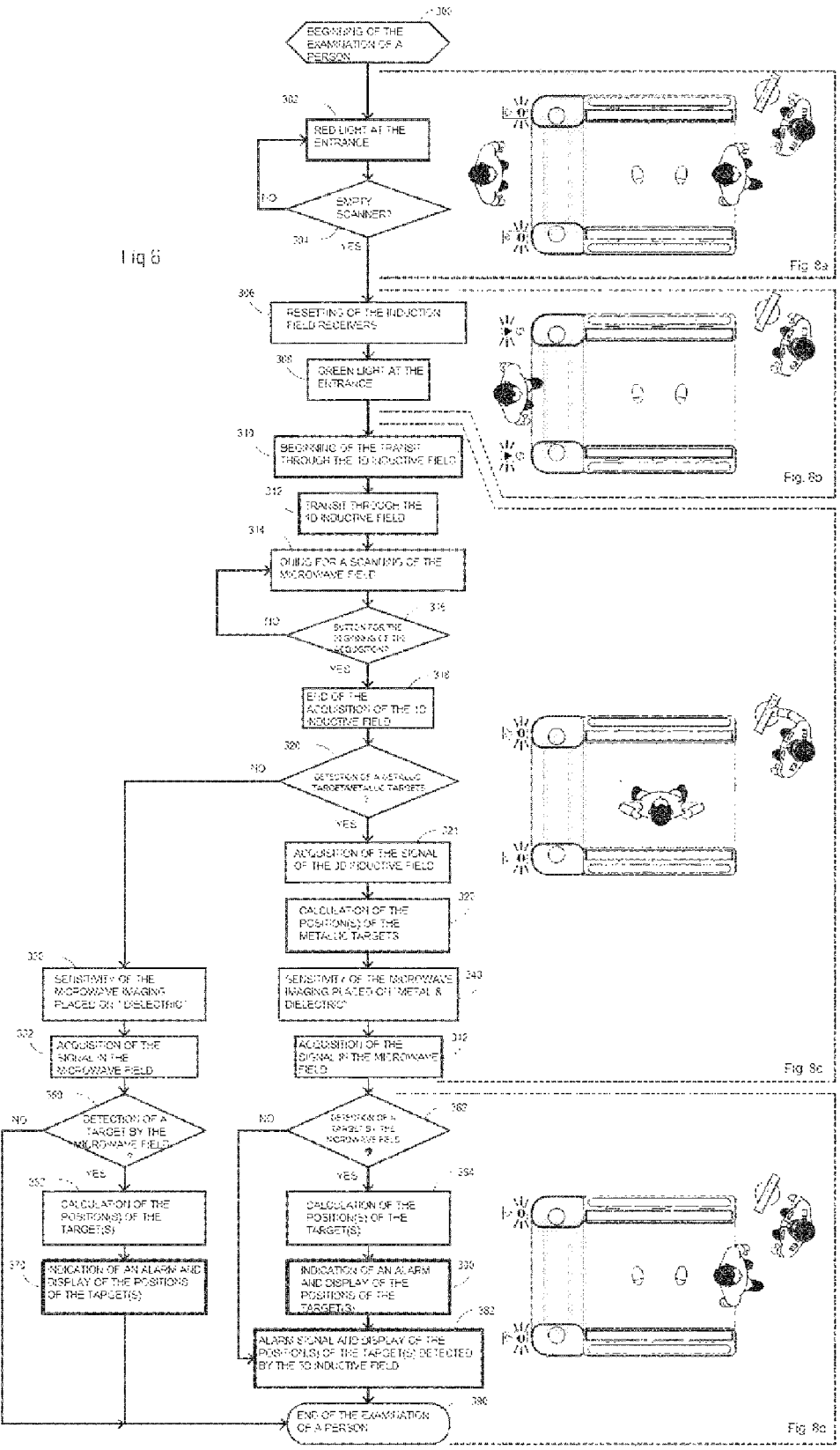

DOUBLE-FIELD SECURITY BODY SCANNER

CROSS-REFERENCE TO RELATED APPLICATIONS

The present application is a national phase entry under 35 U.S.C § 371 of International Application No. PCT/EP2020/052177 filed Jan. 29, 2020, which claims priority from French Application No. 1900765 filed Jan. 29, 2019, all of which are hereby incorporated herein by reference.

FIELD OF THE INVENTION

The present invention relates to the field of detectors designed for the detection of unauthorized objects or substances in an access-protected area.

The present invention relates especially to the field of full-body scanners designed to inspect individuals, for example passengers before boarding, at airports, or individuals accessing a public site, for example a sports venue such as a stadium or an auditorium, in order to detect prohibited objects concealed under clothing. Such apparatuses allow in particular avoiding systematic palpation.

TECHNOLOGICAL BACKGROUND

The examination of individuals, in particular passengers at airports, is carried out traditionally using a walk-through metal detector based on a detection based on an inductive-type field generated by coils. Such walk-through metal detectors are adapted for the detection of metal objects posing a threat, such as firearms, grenades, knives or any other potentially dangerous metal object.

The widespread use of walk-through metal detectors dates back to the 1970s.

If in the past, the targets consisted essentially of conventional medium-sized firearms mainly made of magnetic metals, new types of attacks and the progressive sophistication of weapons now lead to higher detection requirements encompassing light-alloy knives and weapons or other similar small-sized objects.

Despite the reduction in size of the targets, the most recent and advanced metal detectors, still implementing a detection based on an inductive-type field, allow a rapid and efficient inspection of passengers with a fully automatic detection, complete coverage of all the individuals and a low rate of inopportune alarms, typically less than 10% with the existing monitoring procedures currently in place.

The alarms are processed by a palpation or by a secondary research with a portable metal detector by designated officials.

In addition, the use of weak low-frequency non-ionizing inductive fields meets the most stringent requirements in terms of exposure of human individuals to electromagnetic fields, in particular taking into account the specific constraints for children and pregnant women.

However, it is known that attempts to use other types of threats, such as explosives for example have made it necessary to have additional specific detection means dedicated to non-metal materials.

The metal detectors are not adapted to detect non-metal objects because the low-frequency inductive field cannot effectively interact with the non-electrically conductive non-magnetic objects.

For this reason, a new type of equipment has been developed generally referred to as full-body scanner or security scanner or AIT devices (Advanced Imaging Technology devices).

These full-body scanners use microwave field-based imaging detection.

The full-body scanners are adapted to generate a holographic reconstruction of the microwave image of the surface of the body of an examined individual in order to locate metal or non-metal objects constituting a foreign body.

Although the full-body scanners improve security by providing imaging of the non-metal objects, it is well known that the microwave inspection systems used in the full-body scanners have limitations inherent in the physics used, in particular the inability to penetrate the skin and consequently to examine the cavities of the body and the interior of the shoes, as well as the difficulty in obtaining satisfactory images of the peripheral surfaces of the body which are poorly illuminated by the microwave transmitters or which provide reflected signals limited to the receiving antennas.

In addition, if it is desired to apply the same detection criteria for small-dimensioned metal parts correctly detected by high-performance walk-through metal detectors with a low alarm rate, it is necessary to have highly sensitive full-body scanners, which corresponds to an extremely high alarm rate for said full-body scanners.

Statistics reveal the rate of false alarms for full-body scanners in a range comprised between 65% to 85%, including with the most recent and efficient algorithms.

It is therefore observed that, in the state of the art, the rates of false alarms coming from full-body scanners are very clearly higher than the rates of inopportune alarms resulting from walk-through metal detectors.

It follows from the above that the majority of passengers transiting through the full-body scanner are thus frequently seen to be forced to comply with the procedures of manual palpations, which induces long queues and leads obviously to inconvenience and reduced safety for both the public thus examined and the response personnel.

Document EP 1 750 147 in the name of the Applicant describes a detection system comprising inductive field-type detection means associated with additional detection means. In this document, it is particularly proposed to use, simultaneously and within this same system, the inductive field-type detection means and with a gamma/X-ray detector in order to improve the detection. It is also envisaged to modify the sensitivity of the gamma/X-ray detector depending on the detection made by the associated inductive field-type detection means, this modification being made in real time, when an inspected person passes through the system.

Document EP 2 854 217 describes a detection system comprising microwave imaging detection means. In this system, the transmitting antenna is placed in one panel while the receiving antenna is placed in the opposite panel.

Document US 2009/322872 describes a microwave system producing a millimeter image of an inspected person.

Document WO 2018/225028 describes an inspection system comprising on the one hand a full-body scanner and on the other hand a detection device for shoes.

SUMMARY OF THE INVENTION

In this context, one objective of the invention is to propose new means for improving the operating performance of the full-body scanners.

A first objective of the invention is particularly to propose a new full-body scanner which allows an inspection of persons by optimizing the discrimination performance, that is to say the capacities of flow of the concerned persons.

A second objective of the invention is particularly to propose a new full-body scanner which allows an inspection of persons by optimizing the security and discrimination performances, that is to say the capacities of detection and of flow of the concerned persons. The objects above are achieved according to the present invention thanks to a detection system in accordance with claim 1 and a detection method in accordance with claim 13. The dependent claims define embodiments.

Particularly, the detection system comprises inductive field-type detection means and microwave field imaging-type detection means, analysis means adapted to analyze the signals coming from the inductive detection means and deduce therefrom the potential presence of metal targets and means adapted to modify accordingly, at least on one area of interest, the sensitivity of the microwave imaging detection means.

It will be noted that the modification of the sensitivity of the detection means by microwave imaging can be in particular made by modifying image processing parameters by the analysis means, for example using classifications following a neural logic. By way of a non-limiting example, the sensitivity of the microwave 10 imaging can be modified by modifying a threshold (multidimensional, several image processing parameters being modified simultaneously) from which instructions to generate an alarm (sound and/or optical alarm) are sent by the analysis means to a suitable alert device, based on the signals generated by the inductive field-type detection means.

The method for detecting unauthorized objects using a full-body scanner comprises the steps of carrying out an examination of an individual using a dual technique comprising an inductive field-type analysis and a microwave field-based imaging analysis, of analyzing the signal coming from the inductive-type detection means and of modifying the sensitivity of the microwave-based imaging detection means when the inductive-type means detect the potential presence of a metal target.

More specifically within the scope of the invention, the sensitivity of the microwave-based imaging analysis means is placed at a high level when the inductive-type detection means detect the possible presence of a metal target and on the contrary is placed at a lower level when the inductive-type detection means do not detect the possible presence of a metal target.

Thus, within the scope of the invention, if the inductive-type analysis means do not detect the potential presence of metal objects, the sensitivity of the microwave-based imaging analysis means can remain relatively low, at an adequate level for the detection of non-metal objects. It should be particularly noted that the modification of the sensitivity of the imaging analysis means is modified not during the acquisition of the microwave signals, but during their processing by the analysis means.

The usual high rate of false alarms resulting from the use of the microwave imaging-based analysis means (as indicated above on the order of 65% to 85%) being limited according to the invention to the only cases of detection of a metal object beforehand by the associated inductive-type metal detector (themselves on the order of 10%), the overall rate of false alarms resulting from a full-body scanner in accordance with the present invention is relatively low. For the remaining 90% of individuals on whom the metal detecting means do not detect a metal object, the processing of the microwave signals by the analysis means of the full-body scanner is indeed carried out by placing the sensitivity on a low sensitivity level. The overall rate of false alarms resulting from a full-body scanner in accordance with the present invention thus typically falls within a range comprised between 10 and 20%.

Those skilled in the art will understand that the control of the sensitivity of the microwave-based imaging analysis means, by increasing the sensitivity of these microwave-based imaging analysis means forming a full-body scanner, in the only cases where a metal object has been detected beforehand by the metal detecting means, allows considerably reducing the overall rate of false alarms of the system in accordance with the present invention.

Statistically, it can be considered that the criteria for detecting a metal-type induction alarm occurring in less than 10% of an examined population, at least 90% of the inspected persons will be inspected only for dielectric-type (non-metal) targets by the microwave-based full-body scanner, with a reduced-sensitivity microwave field, leading to a very significantly reduced overall rate of false alarms.

It follows that, contrary to what has been described in document EP 1 750 147, the modification of the sensitivity of the additional detection means (by microwave imaging) is not made by modifying an alarm level but by adapting the processing of the signals coming from the imaging detection means so as to modify the microwave image at the output.

In practice, the operator can have on a single screen the display of the result of the inductive-type analysis aimed at the search for a metal object and the imaging resulting from the microwave-based analysis.

DESCRIPTION OF THE FIGURES

Other characteristics, aims and advantages of the present invention will become apparent upon reading the following detailed description, and with regard to the appended drawings given by way of non-limiting examples and in which:

FIG. 4 represents a flowchart similar to FIG. 3, in more detail, with correlative illustration of the successive positioning of an individual in the different elements of the analysis system, at four successive steps illustrated in FIGS. 4a, 4b, 4c and 4d, in the case of detection of metal objects with a one-dimensional inductive field, FIG. 5 represents a view similar to FIG. 4, applied to a flowchart using a three-dimensional inductive field, with correlative illustration of the successive positioning of an individual in the different elements of the analysis system, at four successive steps illustrated in the FIGS. 5a, 5b, 5c and 5d, FIG. 6 represents one alternative of the flowchart in the hypothesis of a co-location of microwave-based analysis means and one-dimensional inductive-type analysis means, with correlative illustration of the successive positioning of an individual in the different elements of the analysis system, in four successive steps illustrated in FIGS. 6a, 6b, 6c and 6d, FIG. 7 represents one alternative of the flowchart in the hypothesis of a co-location of microwave-based analysis means and three-dimensional inductive-type analysis means, with correlative illustration of the successive positioning of an individual in the different elements of the analysis system, in four successive steps illustrated in FIGS. 7a, 7b, 7c and 7d, and FIG. 8 represents another alternative of the flowchart in the hypothesis of a co-location of microwave-based analysis means and three-dimensional inductive-type analysis means, preceded by one-dimensional inductive-type analysis means, with correlative illustration of the successive positioning of an individual in the different elements of the analysis system, at four successive steps illustrated in FIGS. 8a, 8b, 8c and 8d.

DETAILED DESCRIPTION OF THE INVENTION

Figure 1:
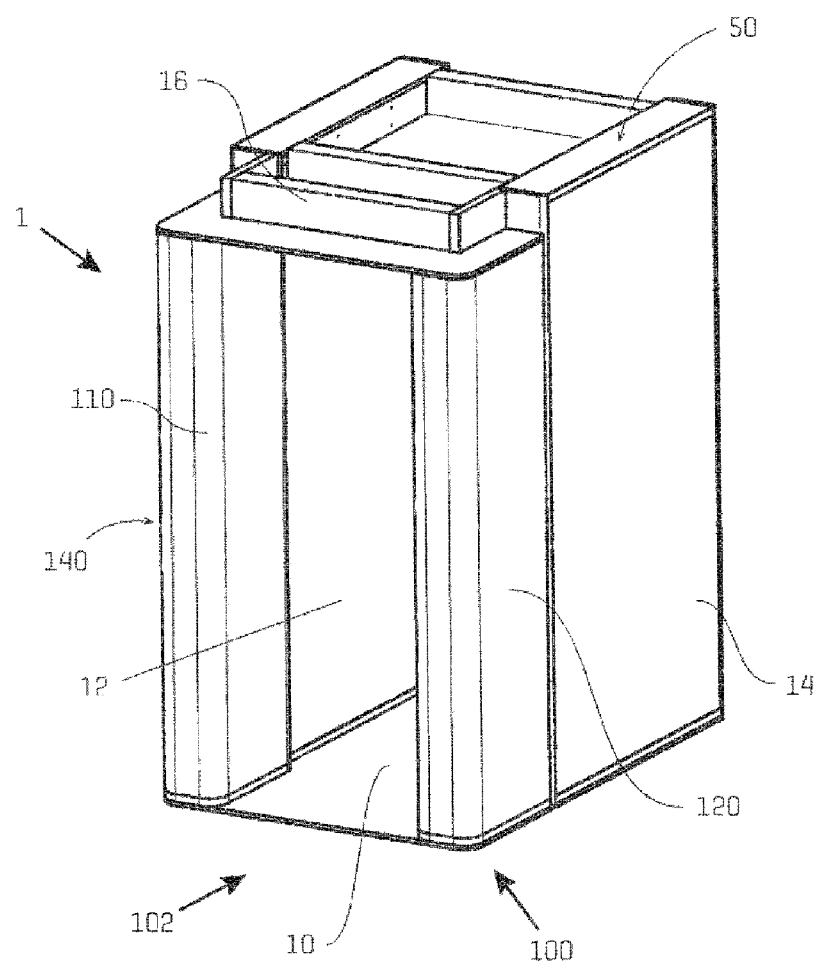
FIG. 1 represents a schematic perspective view of an analysis system in accordance with the present invention.

As indicated above, the invention relates to a system 1 for detecting unauthorized objects or substances in an access-protected area, comprising inductive field-type detection means 100 and microwave field imaging-type detection means 10, associated with analysis means 50 adapted to analyze the signals coming from the inductive detection means 100 and deduce therefrom the potential presence of metal targets and adapt, in order to modify accordingly, at least on one area of interest, the sensitivity of the microwave imaging detection means 10.

It can be noted that the combination of inductive field-type detection means (metal detector) 100 and microwave field imaging-type detection means 10 is synergistic. Particularly, microwave field imaging-type detection means 10 are not capable of distinguishing or determining whether a target object which has been identified is made of metal or of a dielectric material. Indeed, the answer is similar in both cases. It follows that the use of a system in which both inductive field-type and microwave imaging-type detection means are used, in addition to improving safety and reducing inopportune alarms, also allows characterizing the composition of the target displayed by the microwave field imaging-type detection means 10.

The analysis means 30 can in particular comprise a processor, microprocessor, microcontroller-type computer configured to execute instructions.

More specifically, the appended FIG. 1 represents a device in accordance with the invention thus comprising in combination a full-body scanner 10 forming the microwave imaging detection means and a metal detector 100 forming the inductive-type detection means.

In other words, according to the present invention, the full-body scanner 10 integrates a metal detector 100.

The general structure of the full-body scanner 10 and of the inductive-type detection means 100 can be the subject of any known embodiment. It will therefore not be described in detail below.

By way of non-limiting example, the full-body scanner 10 may comply with the provisions described in document EP-2202700.

The full-body scanner proceeds essentially by measuring the microwave energy reflected and/or absorbed based on the properties of the materials examined, in particular based on the complex dielectric properties.

The inductive-type metal detector 100 is preferably formed of a walk-through detector or the same comprising two vertical uprights 110, 120, surmounted by a horizontal bar 16.

The analysis means 50 can be housed anywhere in the casing of the detectors 10 and 100, for example at the bar 16.

The metal detector 100 is preferably placed at the entrance of the full-body scanner 10 as seen in FIG. 1. It defines a channel or passageway 102 that any individual must take to reach the full-body scanner 10. This channel or passageway 102 is framed by two side panels integrated into the uprights 110 and 120 respectively.

The side panels 110, 120 house means 140 forming a metal detector. These means 140 are preferably formed of coils placed respectively in the panels 110, 120.

The coil-based metal detector technology is well known to those skilled in the art. It will therefore not be described in detail hereinafter either.

As a reminder, however, the inductive-type metal detectors generally comprise at least one transmitting coil placed on one side of the passage 102 and at least one receiving coil placed on the opposite side of the passage 102. The transmitting coil is powered by an alternating electric current of monitored frequency, preferably a range of determined and monitored frequencies, to emit a magnetic field, typically between 100 Hz and 50 kHz. The receiving coil is designed to detect the disturbances of this magnetic field due to the presence of a metal object in the passage 102 and to the movement of this metal object in the passage 102, for example the attenuation of the amplitude of the magnetic field, or the signal phase change, due for example to the eddy currents generated on the metal object.

In practice, each of the transmitting and receiving coils is preferably formed of a plurality of elementary coils or turns, covering a respective part of the height of the walk-through detector, to allow discriminating the position of the metal targets detected and thus locating in height the position of these targets.

Furthermore, each of the coils is preferably alternately a transmitting and a receiving coil.

Preferably, the side panels 110, 120 also house means 130 forming passage detection barriers, distributed longitudinally on the path of movement in the channel 102.

Arbitrarily in FIGS. 2a to 2d and 2f, three detection barriers 131, 132 and 133 have thus been represented that any individual entering the system in accordance with the invention successively crosses.

In practice, the invention can use any type of technology to produce the means 130 forming detection barriers.

They may be for example and without limitation optical barriers formed based on pairs of transmitter/receiver disposed respectively in the two side panels 110, 120. An optical signal is transmitted from a transmitter located on one side of the passage 102 to a receiver located on the opposite side of the passage 102, as long as no individual stands on the path of this optical signal. On the other hand, the optical signal is interrupted when an individual who transits through the passage 102 is facing this optical beam.

The passage detection barriers 130 can be formed of any technology other than the optical technology.

The detection of the advance of an individual and of his positioning in the passageway 102 can be made for example using at least one correctly placed camera, allowing detecting, for example by pixel analysis, the successive passage of an individual, by a plurality of fictitious barriers corresponding to the location of the optical barriers 131, 132 and 133 described in the preceding description.

Likewise, the metal detector 100 associated with the full-body scanner 10 in accordance with the invention can be equipped with a Doppler-type system or the same allowing knowing the spot and movement of an individual in the passageway 102.

FIGS. 2a to 2f, which represent a schematic horizontal sectional view of the system in accordance with the invention, represent six non-limiting alternatives.

In FIGS. 2a to 2f, the presence of markings on the ground 20, 22, substantially in the center of the space forming a full-body scanner 10 will be first noted. These markings 20, 22 preferably correspond to the contour of shoe sole prints. These markings 20, 22 are intended to receive the feet of an individual during his examination by the full-body scanner 10. These markings 20, 22 allow guaranteeing a precise positioning of the examined individual relative to a microwave transmitting/receiving means 12 and a microwave receiving/transmitting means 14 placed opposite each other, respectively on either side of the thus formed passageway in the full-body scanner 10, in the extension of the upstream passageway 102 formed by the metal detector 100.

Although this is not represented in the appended FIGS. 2a to 2f, the metal detector 100 can also be provided on the ground with a central line or an equivalent means delimiting the preferred path of the individual during his movement in the metal detector 100 in order to guarantee a precise positioning of the individual relative to the side panels 110, 120 and consequently relative to the detection means 140.

The full-body scanner 10 can be a pass-through scanner. In this case, after having been examined in the full-body scanner 10, the examined individual exits the full-body scanner 10 through its end opposite the metal detector 100.

The full-body scanner 10 can also be closed on its end opposite the metal detector 100. In this case, after having been examined in the full-body scanner 10, the examined individual exits the full-body scanner 10 by passing through the metal detector again 100.

As indicated previously, the inductive-type metal detection means positioned in the side panels 110, 120 of the metal detector 100 are preferably formed from coils.

Figure 2A:
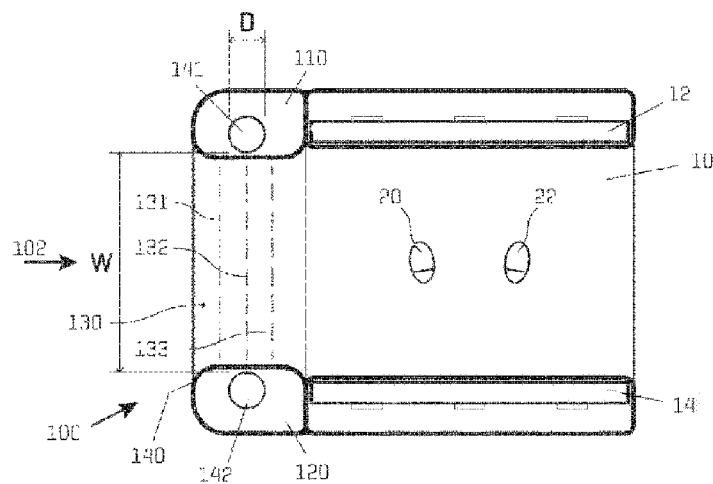
FIGS. 2a, 2b, 2c, 2d, 2e and 2f represent schematic horizontal sectional views of the same detection system in accordance with the present invention, in accordance with respectively six exemplary embodiments of the present invention, FIG. 3 schematically represents a general flowchart of the operation of an analysis system in accordance with the present invention operating a detection of metal objects with an inductive field, allowing a detection of presence of a metal object and an influence of the sensitivity of the microwave-based imaging detection means.

FIG. 2a thus represents a first alternative according to which these means 140 are formed of two transducers 141, 142 configured in the form of a coil wound on respective columns.

Such means 140 allow detecting the presence of metal objects on an individual passing through the metal detector 100. However, they do not allow precisely locating the metal objects on a horizontal section of the individual. In other words, such means do not allow precisely indicating whether a detected metal object is located rather on the front or on the back of an individual, or rather on the left or on the right of an individual.

Preferably, the width D of each column of the transducers 141 and 142 represented in FIG. 2a is comprised between 140 and 300 mm, while the transverse distance W between these columns of the two transducers 141 and 142 is preferably comprised between 680 and 820 mm.

Figure 2B:
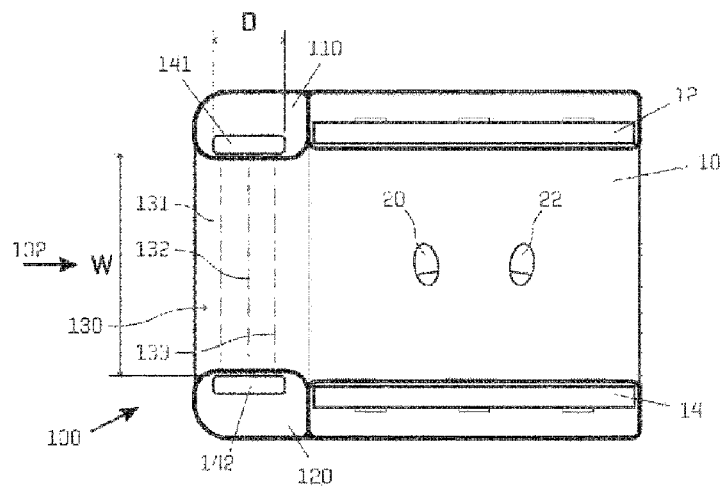

FIG. 2b represents a similar structure comprising a transducer 141, 142 respectively on each side of the metal detector in one of the side panels 110, 120. However, according to FIG. 2b, the transducers 141, 142 are not formed of a coil wound on a column, but of a coil wound on a panel having a longitudinal extension in the direction of movement within the metal detector.

Preferably, the width D of each panel of the transducers 141 and 142 represented in FIG. 2b is comprised between 140 and 600 mm, while the transverse distance W between the panels of these two transducers 141 and 142 is preferably comprised between 680 and 820 mm.

Figure 2C:
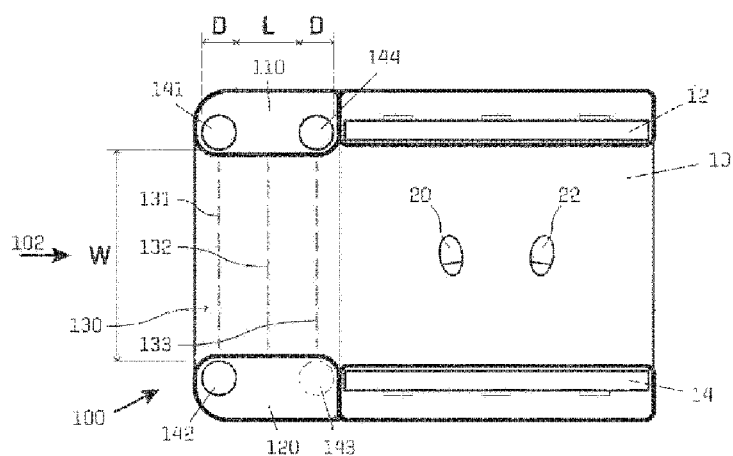

FIG. 2c represents one alternative according to which the means 140 comprise at least three coil transducers distributed between the side panels 110, 120 in the form of at least one coil in a side panel and two coils in the opposite side panel.

The two coils located in a common side panel 110 or 120 are furthermore spaced longitudinally.

Those skilled in the art will understand that the configuration with two transducers represented in FIGS. 2a, 2b allows a metal detection with location thereof in one dimension (in height by cutting the receiving coil in height).

The configurations illustrated in FIG. 2c, for their part, allow a metal detection with a three-dimensional location of the metal. This three-dimensional location is made possible by the fact that the individual successively crosses several privileged detection lines which correspond to dummy lines connecting respectively the centers of the transmitting and receiving coils. Thus, if it is arbitrarily considered that the coil 142 located on one side of the detector 100 is a transmitter, while the two coils 141 and 144 located on the opposite side of the detector 100 are receivers, an individual who moves in the detector 100 successively crosses a first privileged line which connects the transducers 142 and 141, then a second privileged line which connects the transducers 142 and 144.

More specifically, FIG. 2c represents in solid lines a configuration with three transducers: two transducers 141 and 144 in a side panel 110 and a transducer 142 in the opposite side panel 120.

FIG. 2c also represents in broken lines a fourth transducer 143 in the panel 120 common to the transducer 142. The transducer 143 is spaced longitudinally relative to the transducer 142. Advantageously, the transducers 142 and 143 are placed respectively facing the transducers 141 and 144.

FIG. 2c thus corresponds to a configuration with two transducers 141, 144 in the first side panel 110 and two transducers 142, 143 in the second side panel 120. Those skilled in the art will understand that the configuration with four transducers 141, 142, 143 and 144 illustrated in FIG. 2c allows reinforcing the resolution and the reliability of the three-dimensional location of the metal objects detected by adding additional preferential detection lines corresponding to the lines connecting two facing transducers (142 and 141, 142 and 144, 143 and 141, 143 and 144, with the option of making each coil work alternately as a transmitter and a receiver).

Preferably, the width D of each column of the transducers 141, 142, 143 and 144 represented in FIG. 2c is comprised between 140 and 300 mm, the interval L between two adjacent columns 141 and 144, or 142 and 143, is preferably comprised between 1.5 and 3 times the width D, namely between 210 mm and 900 mm, and therefore a center distance between the pairs of transducers comprised between 350 mm and 1200 mm, while the transverse distance W between the columns of these two transducers 141 and 142 is preferably comprised between 680 and 820 mm.

Thus, the angle formed between the detection lines connecting the transducers 141 and 142 on the one hand and 144 and 142 on the other hand is comprised between 15° and 60°, or typically on the order of 30° to 45°. Likewise, the angle formed between the detection lines connecting the transducers 141 and 143 on the one hand and 144 and 143 on the other hand, or the transducers 142 and 141 on the one hand and 143 and 141 on the other hand, or the transducers 142 and 144 on the one hand and 143 and 144 on the other hand, is comprised between 15° and 60°, namely typically on the order of 30° to 45°.

This angle is important in particular to allow locating the metal targets across the width of the individual, that is to say determining whether the metal targets are located rather on the left or the right of the individual. By defining indeed oblique detection lines relative to the direction of movement of the individual, this angle imposes detection lines (142/144, 143/141, 144/142, 141/143) which are cut firstly or lastly by one side of the individual. The location between the front and the back on the individual of the metal targets is, for its part, carried out in particular when the front or the back of the individual crosses the transverse detection lines (141/142, 143/144, 142/141, 144/143).

Of course, the analysis means 50 use all of the data detected by all of the receiving transducers 141, 142, 143 and 144 to specify the location of the metal targets, left/right, front/back. Indeed, the detected metal objects, whether they are located on the left or on the right of the individual, on the front or on the back of the individual, have an influence when they cross a detection line whether it is transverse or oblique.

Figure 2D:
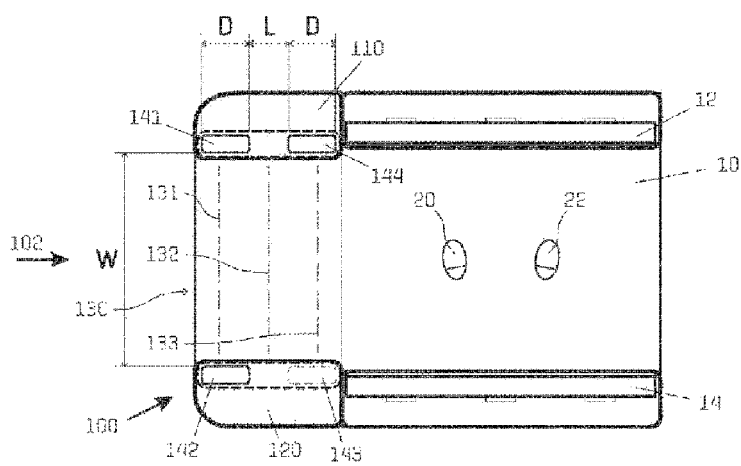

FIG. 2d represents one alternative similar to FIG. 2c according to which the column transducers 141, 144 and 142, 143 of FIG. 2c are replaced in FIG. 2d by panel-type transducers.

The values of width D of transducers 141, 142, 143 and 144, gap L between the transducers, center distance between the transducers, transverse distance W between the transducers and angle between the thus formed transverse and oblique detection lines, indicated for FIG. 2c remain applicable to FIG. 2d.

Figure 2E:
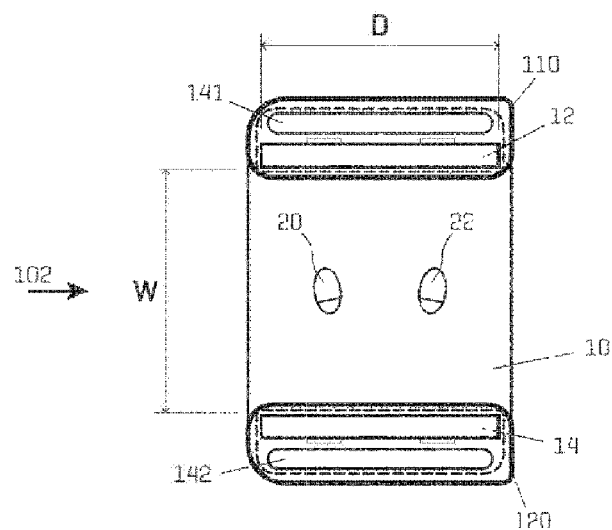

FIG. 2e represents another alternative according to which the inductive-type metal detection means 140 are co-located with the microwave detection means 12, 14.

In other words, according to the embodiment of FIG. 2e, the inductive-type detection means 140 and the microwave detection means 12, 14 are co-located in common side panels surrounding the full-body scanner 10.

More specifically, in a side panel 110, an inductive-type panel transducer 141 and a microwave transmitting/receiving antenna 12 can be seen in FIG. 2c, while in the opposite panel 120 an inductive-type panel transducer 142 and a microwave receiving/transmitting antenna 14 can be seen.

Preferably the width D of the panels 141 and 142 which corresponds to the depth of the full-body scanner is comprised between 920 mm and 1,400 mm, preferably between 1,000 and 1,400 mm, while the transverse distance W between the two transducers 12 and 14 is preferably comprised between 780 and 1,000 mm.

Figure 2F:
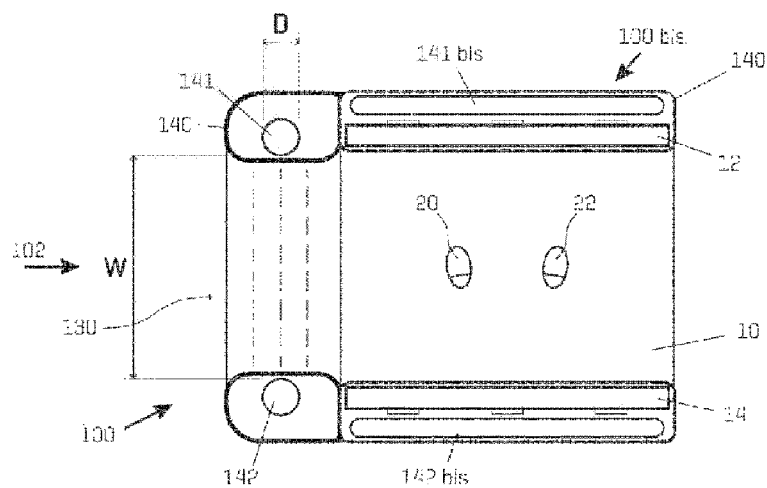

FIG. 2f represents another alternative integrating a full-body scanner in accordance with FIG. 2e according to which inductive-type metal detection means 140 are co-located with the microwave 10 detection means 12, 14. These inductive-type metal detection means co-located with the microwave-type detection means are matched with an index "bis" in FIG. 2f. However, according to FIG. 2f, the device furthermore comprises, upstream of the full-body scanner 10, an additional metal detector 100. According to the embodiment represented in FIG. 2f, this upstream metal detector 100 is formed of two transducers 141 and 142 in accordance with FIG. 2a. As an alternative, this upstream metal detector 100 could comply with FIG. 2b corresponding to detectors formed of panel coils, or where appropriate to one of the embodiments illustrated in FIG. 2c or 2d.

The values of width D of transducers 141, 142, 143 and 144, gap L between the transducers, center distance between the transducers, transverse distance W between the transducers and angle between the thus formed transverse and oblique detection lines, indicated for FIGS. 2a to 2e remain applicable to FIG. 2f.

It will be recalled that within the scope of the present invention, each of the transmitting and/or receiving means can alternately operate in reverse mode, that is to say receiving and/or transmitting mode.

FIGS. 3 to 8 represent different flowcharts of the detection method in accordance with the present invention.

The embodiment illustrated in FIG. 3 will now be described.

This FIG. 3 shows a flowchart which comprises the following successive steps:

step 300: beginning of the examination of a person. At this stage, an individual to be examined is invited to enter the full-body scanner in accordance with the invention, passing through the metal detector 100, step 310: beginning of the transit of the individual through the inductive field generated by the metal detector 100, more specifically by the coils 140. During this step, the examined individual passes/stops, crosses the inductive field inspection area (it is recalled, as indicated above, that the inductive field-based inspection area can be located upstream of the full-body scanner 10 strictly speaking as illustrated in FIG. 1 and FIGS. 2a to 2d or cover the area of the full-body scanner 10 as illustrated in FIGS. 2e and 2f), step 311: acquisition of the signal corresponding to the inductive field, step 320: analysis of the signals coming from the metal detector 100 by the analysis means 50 to find out whether a detection of a metal target has been made or not.

step 330 implemented in case of a negative response to the target detection step 320: the analysis means 50 of the system position the sensitivity of the microwave imaging 10 on a low "dielectric" sensitivity level. The modification of the sensitivity of the microwave imaging 10 is made by modifying microwave image processing parameters by the analysis means 50 with a view to determining whether, based on the signals generated by the metal detector 100, instructions to generate an alarm (sound and/or optical alarm) must be sent by the analysis means 50 to a suitable alert device. In the present case, as the metal detector 100 has not detected a metal target, the analysis means 50 modify the microwave image processing parameters so as to carry out an analysis at the full-body scanner 10 based on an imaging sensitivity in a microwave inspection field which corresponds to a level just necessary to make the detection of dielectric targets, that is to say a sensitivity lower than the one required for a detection of the metal targets. This provision allows limiting the risk of false alarms.

step 340 implemented in case of a positive response in step 320: the analysis means 50 of the system position the sensitivity of the microwave imaging 10 this time at a higher "metal & dielectric" sensitivity level. Here again, the modification of the sensitivity of the microwave imaging 10 is made by modifying the microwave image processing parameters by the analysis means 50. Particularly, this modification of the sensitivity allows detecting both metal targets and dielectric targets. Although more rigorous and likely to generate a higher level of false alarms, this provision is required due to the fact that the metal detector 100 has detected the potential upstream metal presence (this occurs in only 10% of cases, although intrinsically leading to a risk of high rate of false alarms, does not induce a substantial overall rate of risks of false alarms).

step 342: acquisition of the signal from the detection means in the microwave field 10. During this step, the inspected individual is scanned by the microwave inspection field 10. The relevant data coming from the detection means are collected and analyzed so as to generate a microwave image.

step 360: during this step, the analysis means 50 analyze the signals coming from the microwave detection means 10 and find out whether they correspond to the location of a target. For that, the analysis means 50 perform a processing of the microwave image taking into account the sensitivity of the microwave imaging determined in step 330 or in step 340, depending on the response in step 320.

It will be understood that, in one alternative, the step 340 of modification of the sensitivity can alternatively be simultaneous or subsequent to the acquisition step 342, the modification of the sensitivity corresponding to a modification of the microwave image processing parameters.

step 380 implemented in case of a positive response in step 360: indication of an alarm (sound and/or visual alarm) and display of the position of the targets on the microwave image generated by the analysis means 50. The display of the alarm is made available to an operator, typically on a screen with display of the position of the targets detected on the microwave image. It will be observed that step 380 is omitted on the assumption that step 360 does not detect a target.

step 390: end of the examination of an individual.

In one embodiment, during step 340, the analysis means 50 can be configured to modify the sensitivity of the microwave imaging only in the area of the microwave image in which the metal detector 100 has detected a metal target, the sensitivity remaining unchanged in the other areas of the microwave image. In other words, the analysis means 50 modify this sensitivity only in a portion of the microwave image which is obtained from the signals coming from the microwave detection means 10, said portion corresponding to the area in which the metal detector has made a detection of a metal target.

The flowchart represented in FIG. 4 corresponds to one alternative implementation of the method in accordance with the invention in the case of a detection of metal objects with a one-dimensional inductive field using the device illustrated in FIG. 2a.

FIG. 4 shows the steps 300 of beginning of the examination, 312 of transit through the inductive field, 320 of detection of the metal targets, 330 of positioning of the sensitivity of the full-body scanner on a low "dielectric" sensitivity level in case of no prior detection of a metal object, 340 of positioning of the sensitivity of the full-body scanner on the contrary on a high "metal & dielectric" sensitivity level in case of prior detection of a metal object, 342 of acquisition of the signal of the microwave detection field, 360 of location of a target, 380 of indication of an alarm and of display of the position of a target detected on the microwave image generated by the analysis means 50 and 390 of end of the examination, previously described in relation to FIG. 3.

However, it will be observed that FIG. 4 represents a step of acquisition of the signal of the 1D inductive field which is more developed than step 311 of FIG. 3. According to FIG. 4 indeed this acquisition of the signal of the 1D inductive field is composed of the sequence of the following steps:

step 310: beginning of the acquisition of the 1D inductive field, preceding the transit step 312, then a preparation for the implementation of the full-body scanner, in the form of the following steps:

step 314: positioning of the individual for an examination by scanning of the microwave field, step 316: search for a validation of the availability of the full-body scanner, for example by actuation of a validation button by an authorized operator, as illustrated in FIG. 4c, or automatically by a sensor of the position of the person, then step 318: end of the acquisition of the 1D inductive field.

Furthermore, between steps 300 of beginning of the examination and step 310 of beginning of the acquisition of the 1D induction field, the flowchart illustrated in FIG. 4 comprises the following steps:

step 302 of initial provision of a visual signal instructing the individual to be examined to wait before entering the metal detector 100, for example in the form of a red-light signal.

step 304 of search for the presence or absence of a preceding individual still in the examination device. In case of identification of an individual in the device, the latter not being empty, step 304 is looped back to the waiting step 302. On the contrary, if no individual is detected in the device, which is then empty, step 304 is followed by step 308.

Steps 302 and 304 are schematically illustrated in FIG. 4a.

step 308: provision of a visual signal inviting the individual to enter the metal detector 100, for example in the form of a green light signal.

Steps 308 to 312 are schematically illustrated in FIG. 4b.

Steps 314 to 342 are schematically illustrated in FIG. 4c. It will be noted that the feet of the examined individual rest on the markings on the ground 20, 22.

Steps 360 to 390 are schematically illustrated in FIG. 4d.

The flowchart of the operation of a device in accordance with FIG. 2b comprising a detection of metal objects with a one-dimensional inductive field using panels, may be similar to the flowchart illustrated in FIG. 4.

The flowchart represented in FIG. 5 corresponds to one alternative implementation of the method in accordance with the invention in the case of detection of metal objects with a three-dimensional inductive field using the device illustrated in FIG. 2c.

FIG. 5 shows the steps 300, 302, 304, 308, 310 (here of beginning of the acquisition of the 3D inductive field), 312, 314, 316, 318 (here of end of the acquisition of the 3D inductive field), 320 (here of analysis of the signals coming from the metal detector 100 using a 3D inductive field to find out whether a detection of a target or of a metal has been made or not and to locate this target in 3D), 330, 340, 342 of acquisition of the signal of the microwave detection field, 380 and 390, previously described in relation to FIG. 4. These steps will not be re-described.

However, it will be observed that FIG. 5 represents after step 330, in case of non-detection of a metal object by the metal detector 100 in step 320, a series of more detailed steps, before joining the final step 390 at the end of the examination:

a step 332 of acquisition of the signal resulting from the microwave detection field, a step 350 of search for a target detected by the microwave field, followed by the step 390 of end of the examination in case of absence of detection of a target in step 350, a step 352 implemented in case of detection of a target by the microwave field in step 350, consisting of a calculation of the position of each target detected by the microwave field and a step 370 similar to step 380 of indication of an alarm and display of the position of the targets.

It will also be observed that FIG. 5 represents between steps 320 and 340 an intermediate step 322 of calculation of the position of each metal target detected with the 3D inductive field. More specifically, in case of detection of a metal object by the metal detector 100 in step 320, the method determines from the three-dimensional position of each metal object detected during the intermediate step 322 (the means for acquiring the inductive field being here three-dimensional). During step 340, the sensitivity of the microwave imaging can then be set to "metal & dielectric" either in the entire microwave image, or only in the area(s) in which the metal object(s) has/have been detected by the metal detector 10. Step 342 of acquisition of the microwave signal can then be implemented.

As indicated above, the step 340 of modification of the sensitivity may alternatively be simultaneous or subsequent to the acquisition step 342, the modification of the sensitivity corresponding to a modification of the of microwave image processing parameters.

The flowchart of FIG. 5 also comprises, instead of step 360 of FIG. 4, a step 362 of search for the detection of a target using the microwave field, similar to step 350, followed in case of positive response, therefore in case of detection of a target in step 362, by a step 364 similar to step 352, consisting of a calculation of the position of each target detected by the micro-wave field, itself followed by step 380 of indication of an alarm and display of the position of the targets detected by microwaves on the microwave image generated by the analysis means 50.

The flowchart of FIG. 5 further comprises, between steps 380 and 390, a step 382 of indication of an alarm and display of the 3D position of the metal targets detected by the 3D inductive field.

Step 362 continues with this same step 382 when step 362 does not lead to the detection of a target using the microwave field.

Steps 302 and 304 are schematically illustrated in FIG. 5a.

Steps 308 to 312 are schematically illustrated in FIG. 5b.
Steps 314 to 342 are schematically illustrated in FIG. 5c.
Steps 362 to 390 are schematically illustrated in FIG. 5d.

The flowchart of operation of a device in accordance with FIG. 2d comprising a detection of metal objects with a three-dimensional inductive field using panels, may be similar to the flowchart illustrated in FIG. 5.

The flowchart represented in FIG. 6 corresponds to one alternative implementation of the method in accordance with the invention in case of detection of metal objects with a one-dimensional inductive field using the device illustrated in FIG. 2e comprising co-located microwave-based analysis means and one-dimensional inductive-type analysis means.

FIG. 6 shows the steps 300, 302, 304, 308, 314, 316, 320 (here analysis of the signals coming from the metal detector 100 using a 1D inductive field to find out whether a detection of a target or of a metal has been made or not), 330, 340, 342, 360 (here detection of a target with the microwave detection field), 380 and 390, previously described. These steps will not be re-described.

However, it will be observed that FIG. 6 represents between step 304 of search for the availability of the device and step 308 of authorization to enter into the device, a step 306 of initialization or resetting of the 1D induction field receivers and between steps 316 and 320, the step 319 of acquisition of the signal resulting from the 1D induction field.

Steps 302 and 304 are schematically illustrated in FIG. 6a.

Steps 306 and 308 are schematically illustrated in FIG. 6b.

Steps 314 to 342 are schematically illustrated in FIG. 6c.
Steps 360 to 390 are schematically illustrated in FIG. 6d.

The flowchart represented in FIG. 7 corresponds to one alternative implementation of the method in accordance with the invention in the case of detection of metal objects with a three-dimensional inductive field using a device of the type illustrated in FIG. 2e comprising co-located microwave-based analysis means and three-dimensional inductive-type analysis means.

FIG. 7 shows steps 300, 302, 304, 306, 308, 314, 316, 319, 320, 330, 332, 350, 352, 370, 322, 340, 342, 362, 364, 380, 382 and 390, previously described (steps 306, 319, 320 here relating to a 3D inductive field). These steps will not be re-described.

Steps 302 and 304 are schematically illustrated in FIG. 7a.

Steps 306 and 308 are schematically illustrated in FIG. 7b.

Steps 314 to 342 are schematically illustrated in FIG. 7c.
Steps 362 to 390 are schematically illustrated in FIG. 7d.

The flowchart represented in FIG. 8 corresponds to one alternative implementation of the method in accordance with the invention using a device of the type illustrated in FIG. 2f comprising co-located microwave-based analysis means and three-dimensional inductive-type analysis means, preceded by one-dimensional inductive-type analysis means.

FIG. 8 shows steps 300, 302, 304, 306, 308, 310, 312, 314, 316, 318, 320, 330, 332, 350, 352, 370, 322, 340, 342, 362, 364, 380, 382 and 390, previously described (steps 310, 312, 318, 320, here relating to the 1D inductive field, while step 322 here relates to a 3D inductive field). These steps will not be re-described.

It will be observed that FIG. 8 also represents between steps 320 and 322, a step 321 of acquisition of the signal resulting from the induction field 3D.

Steps 302 and 304 are schematically illustrated in FIG. 8a.

Steps 306 and 308 are schematically illustrated in FIG. 8b.

Steps 310 to 342 are schematically illustrated in FIG. 8c.
Steps 362 to 390 are schematically illustrated in FIG. 8d.

Those skilled in the art will understand that the use of a sensitivity level for the microwave imaging detection in the full-body scanner 10 at a sensitivity level sufficient to detect both metal targets and dielectric targets, implemented only when the metal detector 110 has previously detected the possible presence of a metal target, which is only involved at best in 10% of the examinations, allows considerably limiting the risk of false alarms at the full-body scanner.

Indeed, the use in 90% of cases of the dielectric-type sensitivity level at the full-body scanner, that is to say a lower sensitivity allows considerably limiting the risk of false alarms.

The differences existing between the flowcharts referenced in FIGS. 4, 5, 6, 7 and 8 correspond only to optional implementation modalities.

The modes of implementation of the method in accordance with the present invention, schematized by the flowcharts illustrated in FIGS. 3 to 8, can be the subject of numerous alternative embodiments. Particularly, the order of implementation of the different steps can be the subject of numerous variations, some at least of the steps illustrated in FIGS. 3 to 8 can be omitted, reversed, carried out in parallel or completed.

The embodiment represented in FIG. 2f according to which metal detection means 140 allowing a 3D detection are co-located with the full-body scanner 10, but with however additional metal detection means 100 allowing an upstream 1D detection of the full-body scanner 10 also provided, has the advantage that, with this configuration, it is possible to use the induction upstream 1D metal detector optimized for the discrimination between the presence or absence of metal objects and the control accordingly of the sensitivity of the full-body scanner 10 to keep to a minimum the number of inopportune alarms and the 3D metal detector co-located with the induction full-body scanner 10 optimized for the location of the metal objects and thus obtain maximum accuracy in the location of the metal objects. In other words, in one embodiment, the one-dimensional inductive-type detection means 141, 142 are used to determine whether a metal target is to be detected while the three-dimensional inductive-type detection means 141bis, 142bis (which are not necessarily co-located) can be used to accurately determine the three-dimensional position of the metal object(s). The one-dimensional and three-dimensional inductive-type detection means can thus be specialized to make detection without location (case of the one-dimensional means 141, 142) or with location (case of the three-dimensional means 141bis, 142bis).

As indicated previously within the scope of the invention, preferably the result of the inductive-type analysis aimed at the search for a metal object and the result of the microwave-based imaging analysis are displayed on a single screen made available to an operator.

According to one particular embodiment in accordance with the present invention, in case of inductive field detection of one or several targets, the sensitivity of the microwave imaging system 10 is preselected at the "metal & dielectric" level only in the area(s) where the inductive system 100 has determined the presence of metal target(s), while in the other areas the sensitivity of the microwave imaging system 10 is preselected at the "dielectric" level. For this, and as described above, the analysis means 50 are configured not to modify the microwave image processing parameters only in the area(s) in which the metal detector 100 has detected a metal target. In contrast, the sensitivity of the microwave imaging 10 remains unchanged in the other areas of the microwave image in order to limit the rates of false alarms. Thus, the analysis means 50 modify this sensitivity only in a portion of the microwave image which is obtained from the signals coming from the microwave detection means 10, said portion corresponding to the area in which the metal detector has made a detection of a metal target.

In the case of use of a 1D inductive system, the areas in which the sensitivity of the microwave imaging is modified are defined only in height while in the case of use of a 3D inductive system, the areas can be defined in height, width (right/left) and depth (front/back).

The alert device may in particular comprise the at least one of the following devices: a loudspeaker configured to generate an audible alert, a light configured to generate a light signal (such as a light-emitting diode) which may optionally be colored, a screen configured to display an alert message, where appropriate over the microwave image obtained by the analysis means 50.

Of course, the present invention is not limited to the particular embodiments which have just been described but extends to any alternative in accordance with its spirit.

The invention claimed is:

1. A detection system comprising:
inductive detection means configured to generate signals;
microwave detection means configured to generate a microwave image; and
analysis means configured to analyze the signals, to deduce therefrom a potential presence of a metal target, to a position of the metal target, and to adapt accordingly a sensitivity of the microwave detection means such that the sensitivity is greater in an area of interest corresponding to the position of the metal target in the microwave image than in other areas of the microwave image.

2. The detection system of claim 1, wherein the analysis means are further configured to increase the sensitivity of the microwave detection means such that the sensitivity is higher in the area of interest than in the other areas of the microwave image.

3. The detection system of claim 1, wherein the analysis means are configured to adapt the sensitivity of the microwave detection means by modifying microwave image processing parameters of the microwave detection means.

4. The detection system of claim 1, wherein the inductive detection means are positioned in at least one of the following locations: upstream of the microwave detection means; co-located, with the microwave detection means.

5. The detection system of claim 1, wherein the inductive detection means comprise one-dimensional detection means.

6. The detection system of claim 5, wherein the inductive detection means comprise two transducers disposed respectively on either side of a passage defined by the inductive detection means.

7. The detection system of claim 1, wherein the inductive detection means comprise three-dimensional detection means.

8. The detection system of claim 7, wherein the three-dimensional detection means comprise two transducers placed on a same side of a passage defined by the inductive detection means and a transducer disposed on an opposite side of the passage, the two transducers disposed on the same side of the passage being spaced longitudinally.

9. The detection system of claim 8, wherein the transducers of the three-dimensional detection means define transverse and oblique detection lines, wherein the transverse detection lines extend transversally to a passage direction of an individual between the inductive detection means and are configured to discriminate the position of the metal target between a front and a back of the individual, and the oblique detection lines extend obliquely relative to the passage direction to make lateral detections on an individual by discriminating between a left positioning and a right positioning of the metal target on the individual.

10. The detection system of claim 9, wherein an angle formed between the oblique detection lines is comprised between 15° and 60° inclusive.

11. The detection system of claim 1, wherein the inductive detection means comprise one-dimensional detection means upstream of the microwave detection means and three-dimensional detection means co-located with the microwave detection means.

12. The detection system of claim 11, wherein the one-dimensional detection means are configured to determine a presence or absence of the metal target to minimize a number of inopportune alarms and the three-dimensional detection means are configured to determine a position of the metal target to maximize a position accuracy.

13. A detection method comprising the following steps:
generation of a signal with inductive detection means;
generation of a microwave image with microwave detection means;
analysis of the signal;
deduction of a potential presence of a metal target;
when a metal target is identified, determination of a position of the metal target; and
adaptation of a sensitivity of the microwave detection means such that the sensitivity is greater in an area of interest corresponding to the position of the metal target in the microwave image than in other areas of the microwave image.

14. The detection method of claim 13 wherein, during the adaptation step, the sensitivity of microwave detection means is increased such that the sensitivity is higher in the area of interest than in the other areas of the microwave image.

15. The detection method of claim 13 wherein, during the adaptation step, microwave image processing parameters of the microwave detection means are modified.

16. The detection method of claim 13, further comprising the following successive sub-steps:
determination of a presence or an absence of the metal target to minimize a number of inopportune alarms; and
determination of a three-dimensional position of the metal target to maximize a position accuracy.

17. The detection method of claim 13 further comprising a displaying step, wherein a result of the inductive-type analysis is displayed on a screen.

18. The system of claim 9, wherein an angle formed between the oblique detection lines is comprised between 30° and 45° inclusive.

* * * * *